United States Patent
Xing (10) Patent No.: US 7,448,049 B1
(45) Date of Patent: Nov. 4, 2008

(54) SYSTEM AND METHOD OF SUPPORTING KERNEL FUNCTIONALITY

(75) Inventor: Lisheng Xing, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 1070 days.

(21) Appl. No.: 10/647,050

(22) Filed: Aug. 22, 2003

Related U.S. Application Data (60) Provisional application No. 60/419,479, filed on Oct. 18, 2002.

(51) Int. Cl.
G06F 9/00 (2006.01)
G06F 13/00 (2006.01)
G06F 21/22 (2006.01)

(52) U.S. Cl. .......... 719/318; 719/312; 719/320; 719/327; 713/164; 710/240; 710/243; 709/200

(58) Field of Classification Search .......... 713/164
See application file for complete search history.

(56) References Cited

U.S. PATENT DOCUMENTS

| | | | | |
|---|---|---|---|---|
| 5,379,432 A * | 1/1995 | Orton et al. | .......... | 719/315 |
| 5,459,867 A | 10/1995 | Adams et al. | .......... | 395/700 |
| 5,778,226 A | 7/1998 | Adams et al. | .......... | 395/681 |
| 5,854,894 A | 12/1998 | Lancaster et al. | ...... | 395/200.43 |
| 5,991,822 A | 11/1999 | Mealey et al. | .......... | 709/301 |
| 6,163,812 A | 12/2000 | Gopal et al. | .......... | 709/300 |
| 6,209,041 B1 * | 3/2001 | Shaw et al. | .......... | 719/321 |
| 6,212,574 B1 | 4/2001 | O'Rourke et al. | .......... | 709/301 |
| 6,336,120 B1 | 1/2002 | Noddings et al. | .......... | 707/200 |
| 6,412,069 B1 | 6/2002 | Kavsan | .......... | 713/164 |
| 2001/0044904 A1 | 11/2001 | Berg | | |
| 2002/0049834 A1 | 4/2002 | Molmar | | |
| 2002/0091868 A1 | 7/2002 | Molmar | | |

OTHER PUBLICATIONS

Bershad, B., et al, 'SPIN—An Extensible Microkernel for Application-specific Operating System Services', Dept. of Computer Science & Engineering FR-35, Univ. of Washington, Seattle, WA 98195, Technical Report 94-03-03, Feb. 28, 1994, entire document, http://www.cs.cornell.edu/People/egs/papers/spin-tr94-03-03.pdf.*
Veitch, A., et al, 'Kea- A Dynamically Extensible and Configurable Operating System Kernel', Dept. of CS, Univ. of British Columbia, 1996, entire document, http://www.hpl.hp.co.uk/personal/Alistair_Veitch/papers/iccds96/iccds96.pdf.*

* cited by examiner

Primary Examiner—Christian LaForgia
Assistant Examiner—Ronald Baum
(74) Attorney, Agent, or Firm—Sprinkle IP Law Group (57) ABSTRACT

Embodiments of the present invention provide an advantage over prior art software architectures by allowing a kernel to send requests to and receive corresponding results from user space applications. Because the kernel can utilize user space applications, the kernel can use the results of complex calculations without requiring a significantly larger kernel. This provides advantages because programming and debugging of complex algorithms can occur at the user space level rather than the kernel space level.

24 Claims, 6 Drawing Sheets

SYSTEM AND METHOD OF SUPPORTING KERNEL FUNCTIONALITY

RELATED APPLICATIONS

This Application claims priority under 35 U.S.C. 119(e) to U.S. Provisional Patent Application No. 60/419,479, entitled "A Method For Extending Kernel Functionality By Transitioning to User Space," by Lisheng Xing, filed Oct. 18, 2002, which is hereby incorporated in its entirety herein.

TECHNICAL FIELD OF THE INVENTION

Embodiments of the present invention are related to the interaction between the kernel layer and user space. More particularly, embodiments of the present invention are related to supporting kernel layer functionality with processes occurring in user space.

BACKGROUND

Many operating systems are divided into modules that have direct access or privilege to hardware, known as kernels, and programs that must request access to hardware from the kernels, known as user space applications. Kernels are typically the central modules of an operating system, having direct access to a computer's memory, disk drives, network adaptors and other resources, and are typically stored in the computer's main memory. User space applications, on the other hand, have only limited access to a computer's resources and normally have to request access to memory, drives and other hardware from the kernels. As an example, if a user space application, such as a word processing program, has to access a disk drive, the user space application will request that the kernel perform the tasks necessary to carry out the disk access operation. Thus, the kernel acts as an interface between the hardware and user space applications. The interaction between kernels and user space applications, in the prior art, is typically limited to the servicing of hardware calls by the kernel.

Two basic kernel architectures have arisen in modern operating systems, monolithic and micro-kernel. In a monolithic system, a single piece of code has privileges to the resources of the computer and has access to all the data structures and routines of the kernel. The open-source operating system Linux uses a monolithic kernel architecture. In a micro-kernel architecture, conversely, access to hardware, data structures and routines is distributed among multiple specialized kernels. In this architecture, each device may be controlled by its own kernel (or device driver) that has access to only that device. The micro-kernel architecture is employed by the popular Windows Operating system produced by Redmond, Wash. based Microsoft Corporation. In either system, the kernels allow the operating system to centralize access control to the hardware of a computer. Because a kernel can balance service requests from multiple user space applications without conflict, the operating system can more effectively multitask. Moreover, because kernels are generally implemented at a lower level (i.e., closer to the hardware), they allow for more efficient hardware management than if hardware access was managed at the user space level.

Kernels are typically designed to be very light weight. This is done because the kernels stay in the main memory of the computer and light weight code minimizes memory usage. In order to keep the kernels small, each kernel is generally provided with only the limited amount of code required to carry out simple mathematics and hardware access functions, but not additional code to carry out more complicated functions. However, the gradual importation of more complex processing to kernel space can be seen in the evolution of the Microsoft Windows operating system. With each new version of Windows, the device drivers that operate in kernel space have become increasingly more complex. This has allowed more complicated operations to be performed at the kernel level where processing is generally more efficient. Even these kernels, however, do not typically carry out complex mathematical operations.

Placing operations at the kernel level can have the advantage of increased efficiency, but can also have several substantial disadvantages. As an initial problem, kernels are generally more difficult to program than user space applications, leading to increased programming time. Moreover, because kernels stay in main memory, larger kernels require more memory to be permanently employed during the operation of a computer. Also, as the code size of the kernel grows, the likelihood of device mismanagement or a bug in the kernel increases. This is a particular problem as kernels are notoriously difficult to debug and failure of a kernel to run properly can lead to catastrophic failure in a computer (e.g., a "blue screen" crash in the case of memory manager failure).

Because of these difficulties, complex calculations in prior art systems typically take place in user space. For example, authentication routines that require complex mathematical operations have not typically been implemented in the kernel layer. The difficulty in implementing authentication at the kernel layer, particularly for protocols such as iSCSI, results, at least in part, from the fact that authentication protocols generally need the support of a complex multi-precision math library to process authentication challenges and keys, and to handle other complex processes involving large numbers. In prior art systems, this required that authentication be carried out in user space because a kernel that could fully support authentication routines would be too large and unstable to be practicably implemented. The kernel's only involvement in the authentication routine was to service hardware calls, thus maintaining the strict functional boundary between the kernels and user space applications.

SUMMARY OF THE INVENTION

Embodiments of the present invention provide an advantage over prior art software architectures by allowing a kernel to send requests to and receive corresponding results from user space applications. Because the kernel can utilize user space applications, the kernel can use the results of complex calculations without requiring a significantly larger kernel. This provides advantages because programming and debugging of complex algorithms can occur at the user space level rather than the kernel space level.

Embodiments of the present invention provide another advantage over prior art software architectures by allowing the results calculated by user space applications to be passed to kernel space. Because kernel space normally runs more efficiently than user space, further processing in kernel space of the results generated in user space will typically be more efficient than further processing of the same results in user space. Thus, the present invention can increase the efficiency of a system over prior art systems in which the entire process, other than hardware calls, was implemented in user space.

Embodiments of the present invention provide yet another advantage over prior art systems by allowing authentication routines that require complex calculations to occur, at least in part, in kernel space while maintaining relatively light weight kernels.

Embodiments of the present invention provide yet another advantage over prior art systems by requiring less main memory than systems that use heavy weight kernels to perform complex processes.

Embodiments of the present invention provide yet another advantage by increasing the stability of systems over systems that use larger kernels to perform processes at the kernel layer.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for extending the functionality of the kernel layer through user space applications. One embodiment can include a kernel that can pass a request for a process to a user space application. The user space application can carry out the request and send the result of the process to the kernel in a format usable by the kernel for further processing. In this manner, user space applications can be leveraged for performing complex calculations or other processes, while the remainder of the processing can occur at the typically more efficient kernel level.

In one embodiment of the present invention, each kernel capable of passing requests can include a kernel driver application that is capable of initiating requests and a bridge driver that is capable of communicating the requests with a user space application. The kernel driver application can perform any amount of processing capable of being implemented at the kernel layer. By way of example, but not limitation, kernel driver applications can include kernels associated with specific hardware (e.g., a video driver) or kernels designed to carry out a specific task (e.g., an authentication kernel). The bridge driver, which can also be implemented at the kernel layer, can optionally queue requests from the kernel driver application for forwarding to user space, perform any preprocessing that may be required by a given implementation, establish a communications channel with a user space application and forward a request to the user space application.

In user space, a job queue manager and processor can receive the request from the kernel layer and optionally queue the request. The job queue manger and processor can also take a request from the queues or directly from the kernel, translate the request into a format usable by a supporting user space library and forward the request to the supporting library. In addition, the job queue processor and manager can receive results returned by the supporting library in response to the request and can, after optional response queuing, send the results back to the kernel layer in a format usable by the kernel layer. The bridge driver can receive this response and perform any necessary post processing and queuing and return the result to the kernel driver application, which can, in turn, use the result in further kernel layer operations.

Because requests and responses can be passed between the kernel layer and user space layer, embodiments of the present invention can leverage user space libraries to perform complex calculations while performing other processes at the kernel layer. This can allow processes that require complex calculations to be implemented at the kernel layer without requiring that the calculations be performed there. Consequently, sophisticated kernels can be implemented that require significantly less memory space and that are substantially more stable than kernels in which complex calculations occur at the kernel layer.

Figure 1:
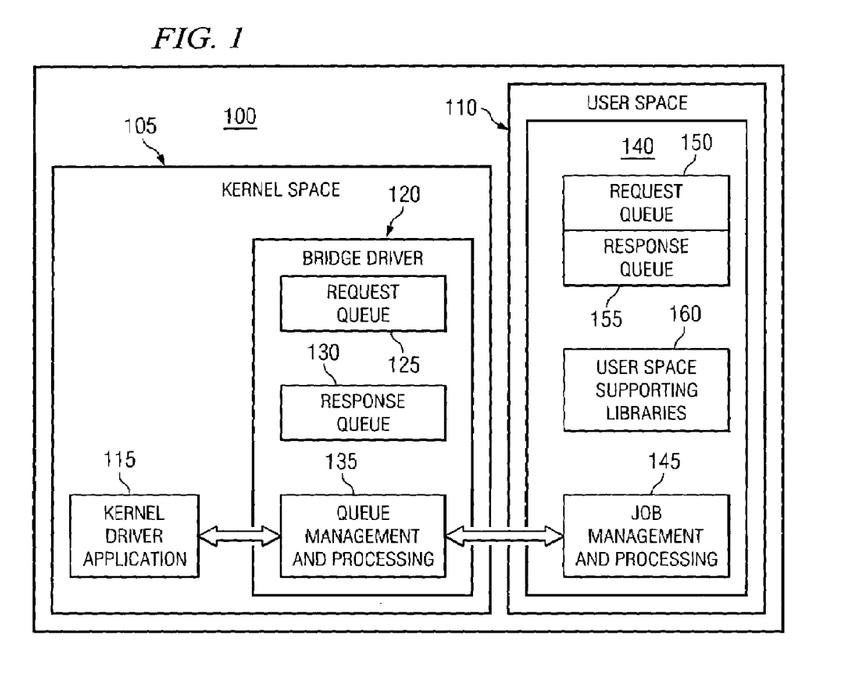
FIG. 1 is a diagrammatic representation of a computer program system using a kernel space-user space architecture according to one embodiment of the present invention.

FIG. 1 is a diagrammatic representation of one embodiment of a computer program system 100 using a kernel space-user space architecture according to one embodiment of the present invention. System 100 can be implemented on a computer as a set if computer instructions that are executable by a computer processor and stored on one or more computer readable memories (e.g., RAM, ROM, hard drive, magnetic disk drive, optical drive or other computer readable memories known in the art). The term "computer," in this context, means any device with memories and processors capable of implementing kernel space-user space architectures, as would be understood by those of ordinary skill in the art. Examples of computers include PCs, mainframes, routers, servers, portable communications devices or any other device capable of executing computer instructions. The computer instructions can be implemented as software, hardware, firmware or in any other manner known in the art.

System 100 can include a kernel layer 105 (alternatively, kernel space 105) and a user layer 110 (alternatively, user space 110). Kernel layer 105 can be implemented as multiple kernels or as a monolithic kernel with all the functionality of kernel layer 105 implemented as a single program. In the preferred embodiment of the present invention, kernel layer 105 can be loaded into the main memory of the computer in which it is implemented when the computer is booted up and can be maintained there until the computer is shut off.

In the embodiment of FIG. 1, kernel layer 105 comprises a kernel driver application 115 and a bridge driver 120. In the case of the Linux operating system, kernel layer 105 can be the Linux kernel, with kernel driver application 115 and bridge driver 120 representing portions of the Linux kernel code. Kernel driver application 115 and bridge driver 120, however, can be implemented in any other suitable manner as would be understood to those of ordinary skill in the art, including as separate kernels. Moreover, while only one bridge driver and one kernel driver application are shown, bridge driver 120 can optionally service requests from multiple kernel driver applications and each kernel driver application can optionally send requests and receive responses through multiple bridge drivers.

Bridge driver 120 can, in one embodiment of the present invention, include a request queue 125 to buffer requests from kernel driver application 115, response queue 130 to buffer responses from user space 110 and a kernel space queue management and processing portion 135 ("bridge manager 135") to establish a communications channel with user space and manage request queue 125 and response queue 130. Queuing of requests and responses may be necessary as kernel space is not always synchronized with user space and because the kernel driver application, as it is implemented on a lower level (i.e., closer to the hardware layer), can, in some embodiments, generate requests faster than the user space layer can receive them.

User space 110 can comprise a user space application 140, having a job manager and processing portion 145 ("job manager 145"), a user space request queue 150, a user space response queue 155 and a supporting library 160. User space request queue 150 and user space response queue 155 can respectively queue requests and responses in user space. It should be noted that the response queues and request queues for user space and kernel space can be the same such that request queue 150 and request queue 125 are the same while response queue 155 and response queue 130 are also the same. It should be further noted that while user space application 140 is shown as a single application in FIG. 1, user space application 140 can comprise several applications or programs, can be part of a larger program or can be implemented in any other suitable programming manner known in the art.

In one embodiment of the present invention, kernel driver application 115 can perform any processing capable of being implemented at the kernel level, including acting as a hardware driver or performing other functionality. As one example, kernel driver application 115 can act as an authentication driver to authenticate devices according to the secure remote password ("SRP") protocol, which, as would be understood by one of ordinary skill in the art, can require complex mathematics. In order to perform these calculations without requiring that the complex mathematics be programmed at kernel layer 105, embodiments of the present invention can leverage mathematics libraries in user space 110.

Kernel driver application 115 can be programmed such that whenever kernel driver application 115 needs support of user space application 140 (e.g., to carry out complex calculations or other processes not programmed in kernel layer 105), kernel driver application 115 can send a request to user space 110. The request can include any information used for processing the request including, but not limited to, an identification indicating the request number (e.g., Request One, Request Two, etc.), a request type indicating the type of request being made if user space application 140 supports multiple request types, and one or more arguments containing the information to be processed.

Bridge driver 120 can establish a communications channel with user space application 140 and forward the request from kernel driver application 115. Additionally, because kernel space is often not synchronized with user space, bridge manager 135 of bridge driver 120 can buffer requests at request queue 125. Bridge manager 135 can manage request queue 125 using any technique known in the art, including on a LIFO basis, a FIFO basis, a priority basis or according to any other queue management technique known in the art. In addition, bridge driver 120 can perform any preprocessing that may be required by a particular implementation to send a particular request to user space application 140. For example, bridge manager 135 can organize requests into queues according to the priority of each request.

In user space, job manager 145 can receive the request from bridge driver 120 and optionally queue the request in request queue 150. Job manager 145 can also read requests from request queue 150 according to any queue management technique known in the art (e.g., FIFO, LIFO, a priority system), perform any translation necessary to put the request in a format understandable by supporting library 160 and forward the requests to a supporting library 160 for processing. Supporting library 160 can comprise any user space program capable of processing requests received from job manager 145, including complex math programs, word processing programs, graphics programs or any other program known in the art.

Based on the request, supporting library 160 can generate a corresponding response. Job manager 145 can receive the result from supporting library 160, perform any translation necessary to put the response in a format understandable by kernel layer 105, optionally queue the response in response queue 155 and send the response to bridge driver 120. In one embodiment of the present invention, bridge driver 120 can receive the response, perform any post processing required by a particular implementation, queue the received response in response queue 130 and send the response to kernel driver application 115. Kernel driver application 115 can then use the response for further processing.

As can understood from the foregoing, kernel driver application 115 can require the results of an operation, such as a complex math operation, to complete a process at the kernel layer. However, kernel driver application 115 does not have to include the programming necessary to carry out the complex math operation itself. Instead, kernel driver application 115 can be configured to send requests to user space to carry out a process and receive the results of the process. In this manner, operations not programmed at the kernel layer can be carried out in user space. This can provide several advantages over prior art systems and methods. More particularly, because kernel application driver 115 can use the results of complex calculations without being programmed to perform the calculations, kernel application driver 115 can perform more complex processes than traditional kernels. Moreover, a kernel that can leverage user space applications to carry out process can remain smaller, more stable, and easier to debug than a kernel that includes the programming necessary to carry out the more complex processes.

Figure 2:
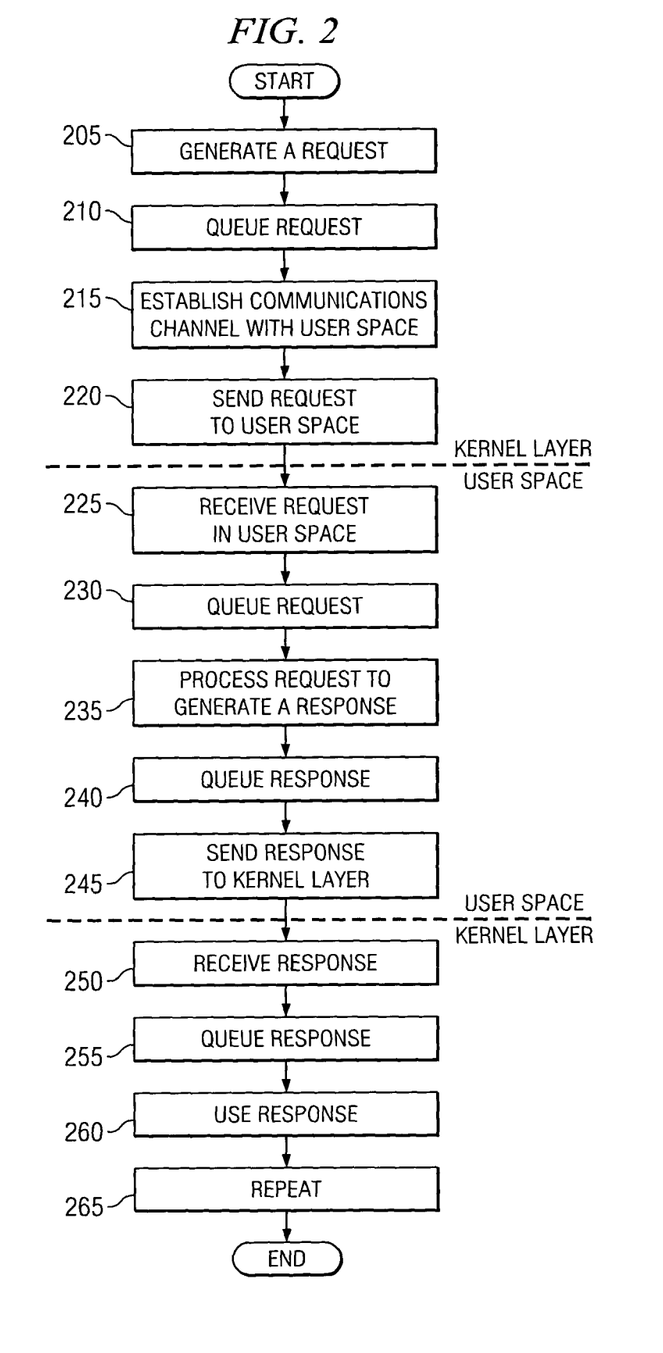
FIG. 2 is a flow chart illustrating one embodiment of a method for passing requests and responses between a kernel layer and user space.

FIG. 2 is a flow diagram illustrating one embodiment of a method for passing requests and results between a kernel layer and user space. At step 205 a kernel (e.g., via kernel driver application 115) can generate a request. In one embodiment of the present invention, a request can be generated whenever a kernel needs the support of a user space application to, for example, perform processing that is not programmed at the kernel layer. The request can include, by way of example but not limitation, any information used for processing the request, such as a request identification (e.g., Request One, Request Two, etc.), a request type indicating the type of request being made and one or more arguments containing the information to be processed. At step 210 the kernel can queue the request and, at step 215, can establish a communications channel with user space. The kernel can then forward the request to user space (step 220).

At step 225, a job manager in user space can receive the request via the established communications channel and, at step 230, can optionally queue the request in user space. The job manger can then forward the request to a supporting user space library for processing. The supporting user space library can be part of the same user space application as the job manager or can be part of a different application. Based on the request, the supporting user space library can perform processing in user space and generate a response (step 235). The processing can include any processing that can be implemented in user space including complex mathematics. At step 240, the job manager can optionally queue the response and, at step 245, send the response to the kernel layer over the same communications channel upon which the request was received or via a different communications channel.

At the kernel layer, the response can be received (step 250) and optionally queued (step 255). In one embodiment of the present invention, receipt and queuing of the response can be carried out by a bridge driver that may be the same as or separate from the kernel driver application that generated the request. At step 260, the kernel that generated the request can use the corresponding response for further processing at the kernel layer. Each time additional support from user space is required, the kernel can generate a new request and steps 205-260 can be repeated (step 265).

In summary, a kernel can generate a request that can be communicated to user space for processing. A user space application can process the request, generate a result, and communicate the result back to the kernel layer. In this manner, the kernel can leverage user space applications to carry out operations that are not programmed in the kernel layer. This can allow a relatively light weight kernel to utilize the results of complex calculations or other processes carried out in user space, thereby extending the functionality of the kernel.

Figure 3:
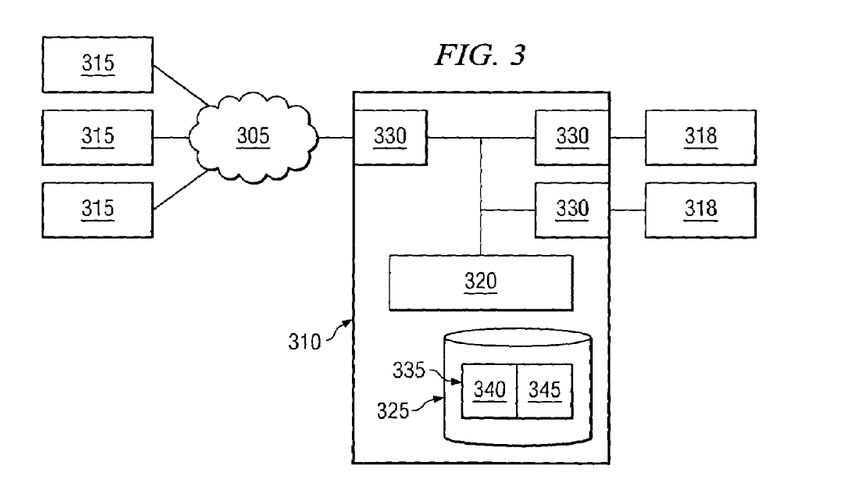
FIG. 3 is a diagrammatic representation of a computer system that can utilize a kernel layer—user space layer architecture according to one embodiment of the present invention.

FIG. 3 is a diagrammatic representation of one embodiment of a computer system that can utilize a kernel layer-user space architecture according to the present invention. The system can include a network 305 (e.g., the internet, a global computer network, an Ethernet network, a WAN, a LAN, a SAN, a fibre channel network, or other network known in the art) having a router 310, servers 315 and storage devices 318. In one embodiment of the present invention, router 310 can be an iSCSI router, operable to route data from servers 315 to storage devices 318. iSCSI router 315 can include a processor 320, a computer readable memory 325 (e.g., RAM, ROM, optical disk, magnetic disk, and/or any other computer readable memory known in the art), and one or more network interface devices 330 (e.g., Ethernet adapter, Fiber Channel adapter, SCSI adapter, or other interface device known in the art). Computer readable memory 325 can store a set of computer instructions 335 that are executable by the processor 320 to perform an authentication process based on a login request from one of the servers. Computer instructions 335 can be executable to have a kernel layer 340 and a user space layer 345.

In one embodiment of the present invention, each server 315 can act as an iSCSI initiator, sending requests to router 310, which acts as an iSCSI target, to store data on one or more of storage devices 318. Before allowing data to be transferred to a storage device 318, router 310 can require that a particular iSCSI initiator authenticate. In other words, router 310 can require an iSCSI initiator to establish that it has permission to store data on storage devices 318. The authentication process can include any authentication process known in the art, such as SRP. Router 310 can receive a login request from a server 315 (e.g., via a network interface device 330) and implement a process to authenticate the server 315. In one embodiment of the present invention, computer instructions 335 can be executable by processor 320 to carry out a portion of the authentication process at kernel layer 340 and carry out another portion of the authentication process at user space layer 345. The portion of the authentication process carried out in user space layer 345 can be based, at least in part, on requests generated from kernel layer 340 and the portion carried out in kernel layer 340 can be based, at least in part, on replies received from user space layer 345 in response to the requests. If the server 315 authenticates, router 315 can route data from the server 315 to one or more storage devices 318.

Figure 4:
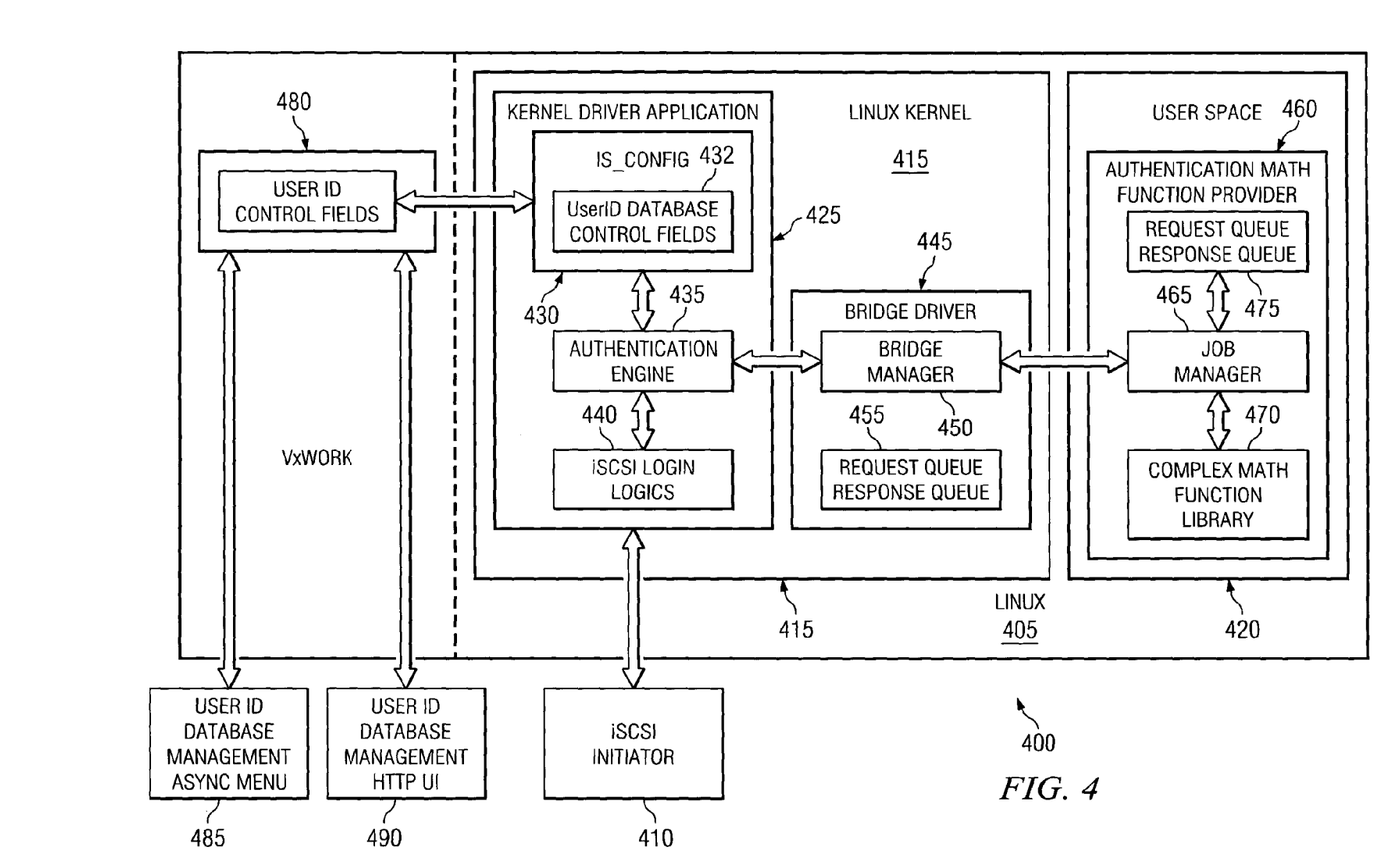
FIG. 4 is a diagrammatic representation of a system in which a kernel can utilize user space support libraries to support an authentication method that partially occurs in the kernel layer, according to one embodiment of the present invention.

FIG. 4 is a diagrammatic representation of one embodiment of a system 400 in which a kernel can utilize user space support libraries to support an authentication method that partially occurs at the kernel layer. In FIG. 4, the computer program layer (e.g., software, firmware, hardware or any other implementation of instructions executable by a computer processor) 6f system 400 is shown. System 400, in one embodiment of the present invention, can include an iSCSI target 405, such as an iSCSI router (e.g., router 310 of FIG. 3) or other iSCSI device known in the art, that is capable of receiving authentication requests from an iSCSI initiator 410. As would be understood by one of ordinary skill in the art, iSCSI is Internet SCSI, an Internet Protocol based networking standard for linking networked devices. By carrying SCSI commands over IP networks, iSCSI can facilitate data storage over long distances. iSCSI target 405 can include kernel layer 415 and user space 420. In the embodiment of FIG. 3, iSCSI target 405 is based on the Linux operating system and kernel layer 415 is represented by the monolithic Linux kernel. Other embodiments of the present invention, however, can use different program architectures, protocols and operating systems.

Kernel layer 415 can include an iSCSI layer driver application 425 that further comprises configuration database 430, authentication engine 435 (i.e., a kernel layer driver), which includes authentication logic, and iSCSI login logics 440. Authentication engine 435 can utilize any authentication method known in the art to authenticate iSCSI initiator 410. A portion of the authentication information used by authentication engine 435 can be stored in configuration database 430, which can further include a user ID database and control fields portion 432.

The user ID database, in one embodiment of the present invention, can contain user-related information, such as a triplet of the form {<username>,<password verifier>,<salt>}, or other user-related information known in the art. The control fields can contain authentication configurations, such as authentication methods supported by iSCSI target 405.

iSCSI Login Logics 440, which can be part of the iSCSI layer, can interact with iSCSI initiator 410 to handle login/logout procedures and with authentication engine 435 to process authentication requests. While configuration database 430, authentication engine 435 and iSCSI login logics 440 are each shown as separate modules of iSCSI layer driver application 425, they can be implemented using any suitable programming architecture known in the art.

In addition to iSCSI layer driver application 425, kernel layer 415 can include bridge driver 445. In one embodiment of the present invention, bridge driver 445 can be a separate kernel from iSCSI layer driver application 425 and can comprise a bridge manger 450 and queues 455 for queuing requests and responses. Bridge driver 445 can provide a communications channel between iSCSI layer driver application 425 and user space 420, pass authentication requests from iSCSI layer driver application 425 and receive the results of processes occurring in user space 420 in response to the authentication requests.

User space 420 can include an authentication math function provider application 460 that can further comprise job manger 465, one or more supporting libraries 470 (e.g., complex math library 470) and user space queues 475. Authentication math function provider application 460 can provide iSCSI layer driver application 425 with complex math functionality based on requests from kernel layer 415. Job manager 465 can receive a request from bridge driver 445, queue the request in user space queues 475 and process the request using complex math function library 470. Job manager 465 can then queue the results of the processing and return the results to bridge drive 445. It should be noted that while authentication math function provider application 460 is shown as a single application in user space 420, its functionality can be distributed among several applications.

In operation, iSCSI initiator 410 can establish a connection, such as a TCP connection, with iSCSI target 405. Once a connection is established, iSCSI initiator 410 can send a login request that includes the iSCSI protocol version supported by iSCSI initiator 410, an initiator name and the authentication methods supported by iSCSI initiator 410. The login and authentication information can be contained in the header of a protocol data unit (PDU). Examples of authentication methods include kerberos, simple public-key, generic security service application programming interface (SPKM), SRP, Challenge Handshake Authentication Protocol (CHAP) or any other authentication protocol known in the art.

iSCSI login logistics 440 of kernel layer 415 can extract header information from the PDU and forward the information to authentication engine 435 according to methods known in the art. Authentication engine 435 can compare the received authentication methods to a set of authentication methods stored in configuration database 430. If iSCSI target 405 and iSCSI initiator 410 support multiple authentication methods, negotiation between iSCSI target 405 and iSCSI initiator 410 can occur to determine a common authentication method for a session. iSCSI target 405 and iSCSI initiator 410 can employ any method of negotiation known in the art, such as least common denominator, to choose a method of authentication.

For the purposes of explanation, iSCSI target 405, in one embodiment of the present invention, only supports SRP. In accordance with the SRP process, iSCSI target 405 can communicate to iSCSI initiator 410 that authentication must occur using SRP. iSCSI initiator 410 can then send a user name to iSCSI target 405 in accordance with the SRP method. Authentication engine 435 can compare the received user name to a user name in configuration database 430. If the user name is contained in configuration database 430, authentication engine 435 can return to iSCSI initiator 410 values for n, g an s. As would be understood by those of ordinary skill in the art, the value n (i.e., the prime modulus) is typically a very large prime number, the value of g is the primitive root modulus of n and s is the salt value associated with the user name in configuration database 430.

iSCSI initiator 410 can generate a public ephemeral key "A" based on the value of g and a random number "a" and pass the value of a to iSCSI target 405, which can verify A. If A is verified, iSCSI target 405 can generate its ephemeral public key "B" based on the value of g, a random number "b", and a password verifier "v" stored in configuration database 430 and communicate B to iSCSI initiator 410. Verification of A and generation of ephemeral public key B, as would be understood by those of ordinary skill in the art, typically require complex math. If these processes are programmed at the kernel layer, the resulting kernel layer would be very large. To help maintain a smaller kernel layer, complex math processes, such as the verification of A or the generation of B can be delegated to user space. Accordingly, to verify A and/or generate ephemeral public key B, authentication engine 435 can generate one or more requests prompting these processes to occur in user space 420. On example of a request structure can be:

unsigned int id;
int request_type;
int arg1, arg2, arg3

In this request, "unsigned int id" can identify the request as the first request, the second request and so on, "int request_type" can identify the type of request, for example a request to verify A or a request to calculate B, and the arguments can include any information to be passed to user space 420 for processing. For example, in a request to verify A the arguments can contain the value of A, while in a request to calculate B the arguments can include values of g, b and v. The request structure given above is provided by way of example only and, as would be understood by one of ordinary skill in the art, any request structure can be used.

Bridge manager 450 of bridge driver 445 can queue the request at kernel layer queues 455 and can establish a communications channel with user space 420. Additionally, bridge manager 450 can perform any preprocessing of a request that is required by a particular implementation. Requests can be read from queues 455 according to any request management technique (e.g., LIFO, FIFO, a priority schedule or other technique known in the art) and can be forwarded to user space 420 by bridge manager 450.

Job manager 465 can receive requests from bridge manager 350 and queue the requests in user space queues 475. Job manager 465 can then read a request from user space queues 475 and forward the request to complex math library 470, which can carry out various processes and generate results based on the request. For example, if the request is to verify A, complex math library 370 can verify A based on SRP methods known in the art and generate a response as to whether or not A is verified. If, on the other hand, the request is to calculate B, complex math library 470 can calculate B using g, v and b and generate a response containing B. As with requests, job manger 365 can queue the response before sending the response back to kernel layer 415. At kernel layer 415, bridge manager 350 of bridge driver 445 can receive the response and queue the response at queues 355. Bridge manager 450 can also perform any postprocessing required by a particular implementation and forward the response back to authentication engine 435. Assuming A is verified and B generated, authentication engine 355 can then send B to iSCSI initiator 410.

When iSCSI initiator 410 receives B, iSCSI initiator 410 can generate a value S based on the salt s, public ephemeral key B, a long-term private key x and random a. Additionally, iSCSI initiator 410 can hash S to generate M and send M to iSCSI target 405. iSCSI target 405 can authenticate M and calculate a value for HM based on public ephemeral key A, the password verifier v and b. If M is verified, iSCSI initiator 410 is verified and iSCSI target 405 can communicate HM to iSCSI initiator 410. If iSCSI initiator 410 verifies the value of HM, target 405 will be verified and the communication of non-authentication data from iSCSI initiator 310 to target 305 can begin. The verification of M and calculation of HM, as with the verification of A and calculation of B, can require complex mathematical processes and, therefore, can occur in user space 420 based on requests from authentication engine 435.

In the embodiment shown in FIG. 4, a portion of the SRP authentication method at iSCSI target 405 can occur in kernel layer 415 while another portion can occur in user space 420. Determining which processes occur at which layer, in one embodiment of the present invention, can be based on the overall efficiency of the system with simpler processes occurring in kernel layer 415 and more complex processes occurring in user space layer 420. This can provide the advantage of allowing a portion of the processing to occur at the typically more efficient kernel level without requiring that the kernel become too large, and potentially unstable, with programming for complex operations. In a system that receives a large number of authentication requests, such as an iSCSI router, implementing a portion of the programming at the kernel layer can result in substantial efficiency gains over systems that implement the entire authentication process (other than servicing of hardware access calls) in user space.

Although only one iSCSI initiator 410 is shown in FIG. 4, iSCSI target 405 can service requests from multiple iSCSI initiators. In the embodiment of the FIG. 4, the basic authentication information can be stored in configuration database 430 as, for example, an entry containing a user name, a password verifier and a salt value. Information associated with new iSCSI initiators that can be authenticated by iSCSI target 405 can be added to configuration database 430, in one embodiment of the present invention, by an administrator. As shown in FIG. 4, for example, this can be done by sending information from an administrator database 480 to configuration database 430 over the iSCSI protocol layer (iSCSI PL) using an Intelligent Input/Output ("I$_2$O") channel. I$_2$O, as would be understood by those of ordinary skill in the art, is a standard mechanism for passing messages between a host processor and an intelligent I/O processor. In one embodiment, data can be passed from administrator database 480 to configuration database 430 each time iSCSI target 430 is rebooted. Administrator database 480 can be updated, in one embodiment of the present invention, directly (e.g., via serial interface 485) or remotely (e.g., via HTTP interface 490).

Figure 5:
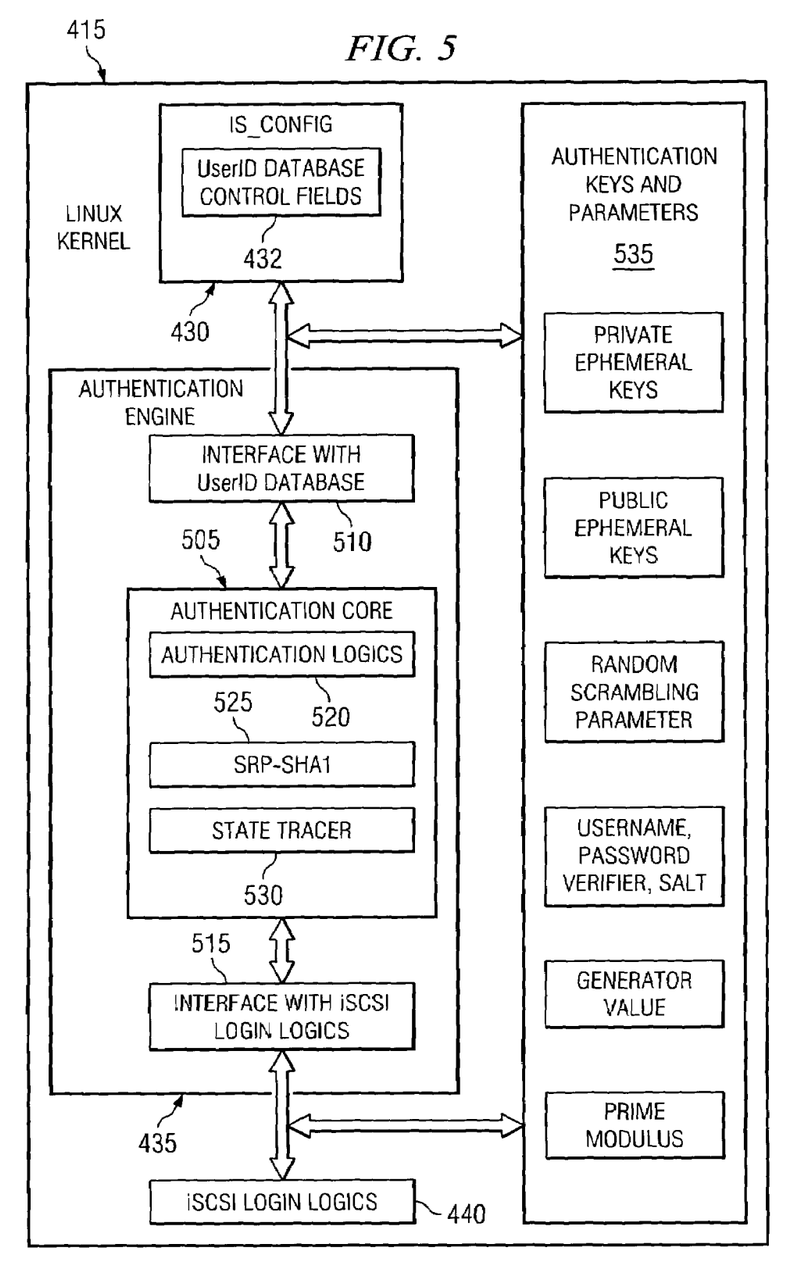
FIG. 5 is a diagrammatic represent of one embodiment of a portion of a kernel layer.

FIG. 5 is a diagrammatic representation of one embodiment of a portion of kernel layer 415 including configuration database 430 (with user identification database and control fields 432), authentication engine 435 and iSCSI login logics 440. Authentication engine 435 can include an authentication core 505 that includes the logic to carryout authentication and interfaces to connect authentication core 505 to configuration database 430 and iSCSI login logics 440 (e.g., configuration interface 510 and login interface 515, respectively).

As described earlier, a portion of the authentication information used by authentication engine 435 can be stored in configuration database 430 can include a user ID database and control fields portion 432. The user ID database, in one embodiment of the present invention, can contain user-related information, such as a triplet of the form {<username>,<password verifier>,<salt>}, or other user-related information known in the art. The control fields can contain authentication configurations, such as authentication methods supported by iSCSI target 405. Authentication can occur in response to a connection established with an iSCSI initiator. iSCSI Login Logics 440, which can be part of the iSCSI layer, can interact with the iSCSI initiator to handle login/logout procedures and with authentication engine 435 to process authentication requests. While configuration database 430, authentication engine 435 and iSCSI login logics 440 are each shown as separate modules of iSCSI layer driver application 425, they can be implemented using any suitable programming architecture known in the art.

Authentication core 505 can further include authentication logics portion 520, secure remote password-secure hash algorithm ("SRP-SHA") portion 525 and state tracer portion 530. Authentication logics portion 520 can contain the logic necessary to process authentication information received from iSCSI initiator 410, generate requests to user space 420 to carry out tasks (e.g., verify A or generate B), and use results received from user space. SRP-SHA portion 525 can include hashing algorithms to, for example, hash a value received from user space to generate HM. State tracer portion 530 can include rules for generating error results when, for example, authentication fails, a connection is dropped or another error occurs.

As illustrated in FIG. 5, authentication engine 435 can use various parameters 535 in the authentication process. Parameters 435 for the SRP method can include, by way of example but not limitation, private ephemeral keys, public ephemeral keys, random scrambling parameters, usernames, password verifiers, salt values, generator values and prime modulus values. Authentication engine 435 can receive parameters 535, in one embodiment of the present invention, from configuration database 430, an iSCSI initiator via iSCSI login interface 515 and/or from user space applications. Keys and parameters 535 can be used in the SRP method as described in conjunction with FIGS. 4 and 6.

It should be noted that parts of authentication engine 435 shown in FIG. 5 can be implemented in user space rather than in kernel layer 415. For example, hashing can occur in authentication math function provider application 460 based on a request generated by authentication engine 455. Therefore, it should be understood that implementation authentication engine 435 and delegation of tasks between the kernel layer and user layer can occur in any suitable programming manner, as would be understood by those of ordinary skill in the art.

Figure 6A:
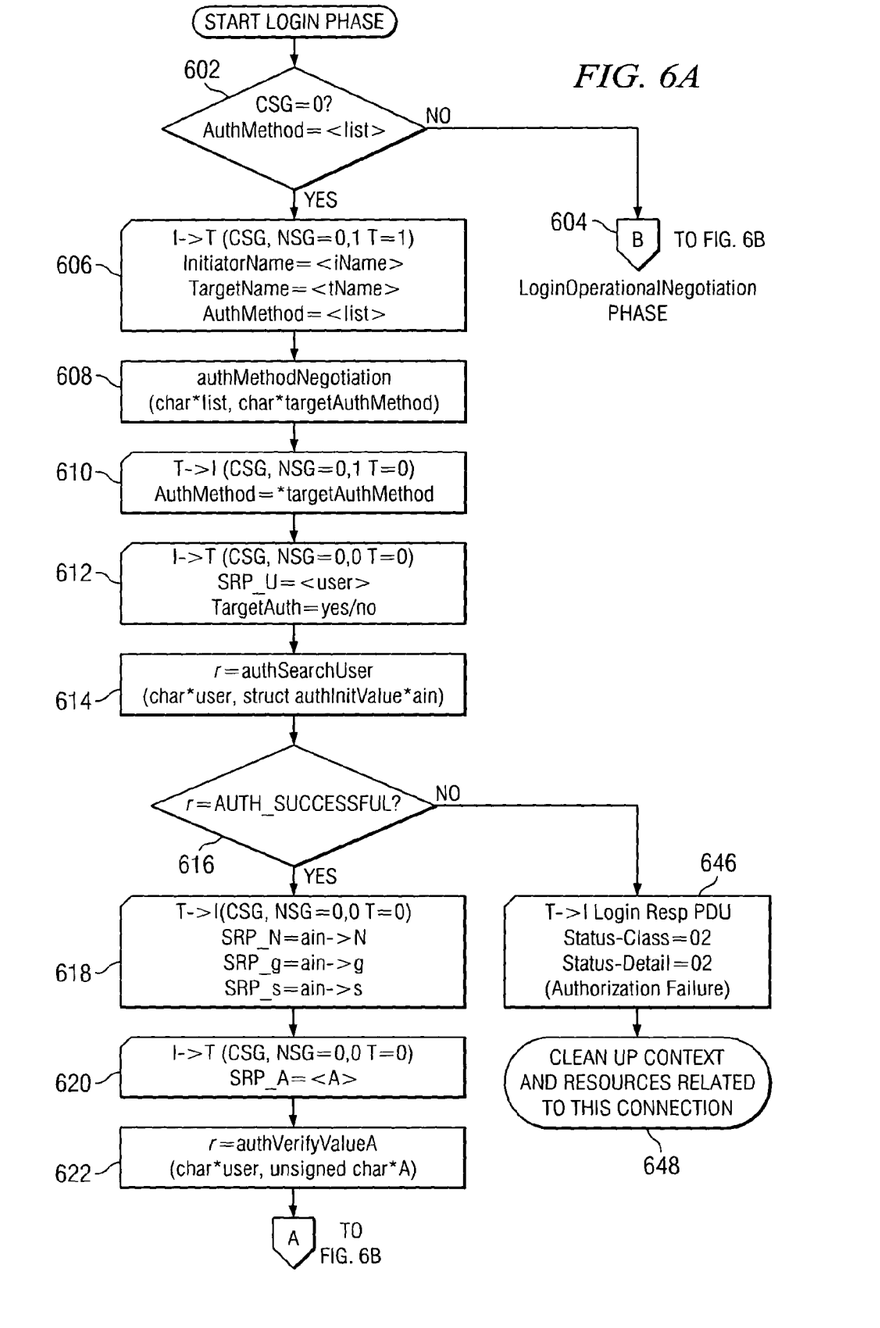
FIGS. 6A and 6B are a flow chart illustrating one embodiment of method of authenticating a device.
Figure 6B:
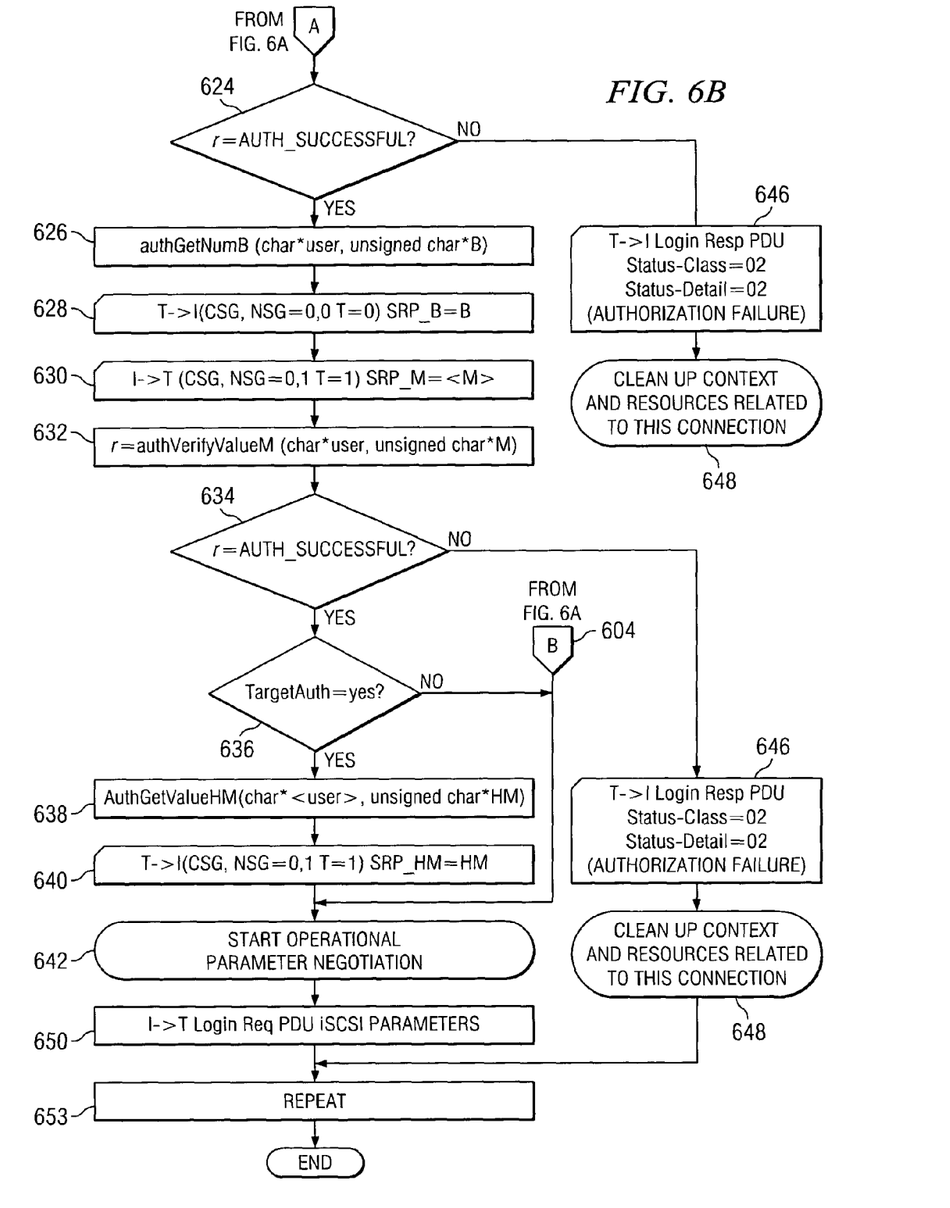

FIGS. 6A and 6B are a flow diagram illustrating a method for SRP authentication according to one embodiment of the present invention. In the embodiment of FIG. 6, an iSCSI target, at step 602, can determine if, authentication is required from iSCSI initiators, which is indicated if the current stage ("CSG") parameter is set to zero, and if the iSCSI target (e.g., iSCSI target 405) supports authentication methods. If the CSG parameter is not set to zero or if the iSCSI target does not support any authentication methods, the iSCSI target can indicate to iSCSI initiators to proceed to operational parameter negotiation (step 604) in response to a request. Otherwise the iSCSI target can require authentication.

At step 606, an iSCSI initiator (e.g., iSCSI initiator 410 of FIG. 4) can send an initiator name, target name and list of supported authentication methods to the iSCSI target. The next stage parameter ("NSG"), CSG and T included in the transmission from the iSCSI initiator to the iSCSI target can be used, as would be understood by those of ordinary skill in the art, to coordinate the authentication session. It should be noted that the parameters CSG, NSG and T, along with additional parameters such as A, B, M, HM, g, n, v and s (discussed below) are commonly used for SRP and would be known to those of ordinary skill in the art.

The iSCSI target, at step 608, can determine if it supports any of the received authentication methods by, for example, comparing the authentication methods received from the iSCSI initiator to a list of authentication methods in a configuration database (e.g., configuration database 430 of FIG. 4). At step 608, the iSCSI target can send back to the iSCSI initiator a list of supported authentication methods. The iSCSI target and the iSCSI initiator can select a common authentication method based on any negotiation scheme known in the art. In the example of FIG. 6, the iSCSI initiator and target can select SRP as a common authentication method, though any other authentication method known in the art can be used.

Once an authentication method is agreed upon, the iSCSI initiator can send parameters associated with the authentication method to the iSCSI target. Because, in the example of FIG. 6, SRP is being used as the authentication method, the iSCSI initiator, at step 612, can send a user name and whether the iSCSI initiator also requires the iSCSI target to authenticate (i.e., whether the iSCSI initiator requires bi-directional authentication). The iSCSI target can search the configuration database for the user name (step 614) and, if the user name is found (step 616), the iSCSI target can, at step 618, return values for N, g and s specified by the SRP protocol (i.e., a large prime number, a prime root and the salt value associated with the user name). Based on the values of N, g and s, the iSCSI initiator can send to the iSCSI target a public ephemeral key A (step 620).

In one embodiment of the present invention, each of the steps performed thus far at the iSCSI target can occur at the kernel layer. However, because programming of complex mathematics at the kernel layer could result in a large kernel, the iSCSI target can leverage user space applications for verification of the value of A in steps 622-624. When the iSCSI target receives A from the iSCSI initiator, the kernel layer can format a request to a user space authentication math function provider application to verify A. The kernel layer can optionally queue the request, establish a communications channel with the math function provider application and forward the request to the math function provider application. A job manager can receive the request, optionally queue the request and forward the request to a supporting complex math library for further processing. The supporting complex math library, in turn, can process the request (e.g., verify A according to SRP processes known in the art) and generate a result as to whether or not A is verified. The job manager can optionally queue the result and send the result back to the kernel layer.

If, at step 624, the value of A is verified, the iSCSI target can generate public ephemeral key B and return it to the iSCSI initiator. As with the verification of A, generation of B can require the use of large numbers and complex mathematical processes. Therefore, based on a request from the kernel layer, the iSCSI target can generate B in user space (step 626) and pass B back to the kernel layer. At step 628, the iSCSI target can communicate B to the iSCSI initiator. In response, the iSCSI initiator can generate M and send M to the iSCSI target (step 630). At step 632, the iSCSI target can verify M, a process that can also require the use of large numbers and complex mathematics. The kernel layer of the iSCSI target can send a request to an authentication math function provider application to verify M in user space. The authentication math function provider application can carry out the process of verifying M and send the results back to the kernel layer.

If M is verified (step 634), the iSCSI target can determine if the iSCSI initiator requires bi-directional authorization (step 636). The iSCSI target can do this by, for example, checking the parameters received from the iSCSI initiator at step 612 (i.e., by checking if the "TargetAuth" parameter is set to yes or no as would be understood by those of ordinary skill in the art). If the iSCSI initiator does not require the iSCSI target to authenticate, control can pass to step 642 and operational parameter negotiation can begin. If, on the other hand, the iSCSI initiator does require the iSCSI target to authenticate, the kernel layer of the iSCSI target can send a request to the authentication math function provider application to generate a value for HM (step 638). The authentication math function provider application, in response to the request, can generate HM and send HM from user space to the kernel layer. The iSCSI target can then send HM to the iSCSI initiator (step 640). If the iSCSI target is properly authenticated at the iSCSI initiator, the iSCSI initiator will begin operational parameter negotiation and will send operational parameters in the next PDU (steps 642-644).

In summary, the SRP method, as would be understood by those of ordinary skill in the art, involves verifying and generating various authentication parameters. An iSCSI initiator can generate and an iSCSI target can verify authentication parameters A and M (steps 642 and 634, respectively). If the parameters are verified the authentication process can continue as described above. If, however, the parameters can not be verified, the iSCSI target can send an authorization failure message to the iSCSI initiator (step 646) and close the connection (step 648). The authentication process can be repeated (step 650) for each new authentication request from an iSCSI initiator.

The verification of A and M and the generation of B and HM require the use of complex mathematical processes and large numbers. To avoid programming this at the kernel layer and the attendant problems associated with complex kernels, these processes can occur in user space based on requests from the kernel layer, while the remainder of the authentication process can occur in the kernel layer. This allows embodiments of the present invention to utilize existing or new support libraries to provide support to processes occurring in the typically more efficient kernel layer. In a system that receives a large number of authentication requests, such as an iSCSI router, implementing a portion of the programming at the kernel layer can result in substantial efficiency gains over systems that implement the entire authentication process (other than hardware access calls) in user space.

FIGS. 3-6 provide specific examples of a kernel layer-user space architecture used to perform the SRP authentication method. These embodiments are provided by way of example and not limitation. Whether a specific process in the SRP authentication method occurs in the kernel layer or user layer can be a matter of implementation. For example, verification of A and M can be programmed at the kernel layer while calculation of B and HM can be programmed in user space. As another example, HM, as would be understood by those of ordinary skill in the art, is a hashed value. In one embodiment of the present invention, hashing can occur in user space while in another embodiment of the present invention hashing can occur at the kernel layer.

Furthermore, embodiments of the present invention can carry out any process in which a user space application can support a kernel layer process. For example, embodiments of the present invention can authenticate for various protocols (SCSI, IP/TCP, fibre channel, or other protocols known in the art) using SRP or other authentication methods known in the art. Other embodiments can act as hardware drivers using the support of user space applications to carry out part of the driver process (e.g., to carry out complex calculations) or can carry out any other process known in the art that can be at least partially implemented in the kernel layer.

In the examples given previously, the kernel layer process carried out simpler tasks while the user space application carried out tasks that would be difficult to program at the kernel layer. However, tasks can be delegated between the layers in any manner, with simple tasks being carried out in user space and/or more complex tasks being carried out at the kernel layer or in any other manner as would be understood by those of ordinary skill in the art.

The present invention provides a system of extending the functionality of the kernel layer by allowing portions of a process to occur at the kernel layer, while leveraging the complexity and stability of user space to carry out other portions of the process. Embodiments of the present invention provide a system and method for passing the results of processes performed in user space to kernel space. One embodiment can include a kernel that can pass a request for a process to a user space application. The user space application can carry out the request and send the result of the process to the kernel in a format usable by the kernel for further processing. In this manner, user space applications can be leveraged for performing complex calculations or to carry out other processes, while the remainder of the processing can occur at the typically more efficient kernel level.

Because the kernel can send requests to and receive response from user space applications, the kernel can utilize the results of complex calculations without requiring a significantly larger kernel. This provides additional advantages because programming and debugging of complex algorithms can occur at the user space level rather than the kernel space level. Moreover, because kernel space normally runs more efficiently than user space, further processing in kernel space of the results generated in user space will typically be more efficient than further processing of the same results in user space.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method of supporting a kernel comprising:
    implementing
        a kernel driver application and
        a bridge driver
    at a kernel layer loaded into a main memory of a computer, wherein
        the kernel driver application initiates requests and
        the bridge driver communicates requests with at least one user space application residing at a user space;
    at the kernel layer,
        receiving a request for processing from the kernel driver application;
        forwarding the request for processing to a user space application;
    at the user space,
        receiving the request for processing;
        processing the request in the user space to generate a response based on the request; and
    communicating the response to
        the bridge driver at the kernel layer.

2. The method of claim 1, wherein the response is utilized by the kernel driver application for further processing at the kernel layer.

3. The method of claim 1, wherein
    the bridge driver opens a communications channel between the kernel layer and the user space.

4. The method of claim 1, further comprising queuing the request for processing.

5. The method of claim 1, further comprising queuing the response from the user space.

6. The method of claim 1, further comprising:
    implementing a job manager and a supporting library at the user space, wherein the job manager is capable of receiving the request in the user space and forwarding the request to the supporting library for processing, wherein the supporting library includes the user space application, and wherein the user space application is capable of processing the request in the user space.

7. The method of claim 1, further comprising queuing the request and the response in the user space.

8. A system with extended kernel functionality comprising:
    a processor; and
    a computer readable storage medium accessible by the processor and carrying computer instructions executable by the processor to:
    generate a request in a kernel layer of the system;
    forward the request to a bridge driver at the kernel layer;
    establish a communications channel between the kernel layer and a user space;
    send the request via the communications channel to a user space application residing at the user space of the system;
    process the request in the user space to generate a response corresponding to the request; and
    return the response to the kernel layer.

9. The system of claim 8, wherein the computer instructions are further executable to implement a request queue to buffer requests received from the kernel driver application at the kernel layer and a response queue to buffer responses received from the user space application at the user space.

10. The system of claim 8, wherein said computer instructions are further executable to queue said request and said response in the kernel layer.

11. The system of claim 8, wherein said computer instructions are further executable to queue the request and the response in the user space.

12. The system of claim 8, wherein said kernel layer comprises a kernel driver application capable of initiating the request and wherein the bridge driver is capable of preprocessing the request.

13. The system of claim 8, wherein said bridge driver further comprises a kernel request queue and a kernel response queue and wherein said bridge driver is further operable to queue the request and the response in the kernel layer.

14. The system of claim 8, wherein the user space further comprises:
    a job manager operable to receive the request from the kernel layer; and
    a support library operable to process the request and generate the response.

15. The system of claim 14, wherein the user space further comprises a user space request queue and a user space response queue and wherein the job manager is further operable to queue the request and response in the user space.

16. The system of claim 14, wherein said job manager is further operable to translate the request into a format usable by the support library.

17. The system of claim 16, wherein the job manager is further operable to forward the translated request to the support library.

18. The system of claim 17, wherein the job manager is further operable to translate the response in the user space into a format usable by the kernel layer before sending the response back to the kernel layer.

19. A system of extended kernel functionality comprising:
a kernel driver application implemented at a kernel layer operable to generate a request for processing to be forwarded to a user space application residing at a user space;
a bridge driver implemented at the kernel layer operable to:
receive the request for processing from the kernel driver application;
establish a communications channel between the kernel layer and the user space; and
communicate the request for processing via the communications channel to the user space application;
a support library implemented at the user space operable to process the request for processing in the user space; and generate a corresponding response; and
a job manager implemented at the user space operable to:
receive the request for processing from the bridge driver at the kernel layer;
forward the request for processing to the support library; and
forward the corresponding response generated by the support library to the bridge driver at the kernel layer.

20. The system of claim 19, wherein the bridge driver is further operable to:
receive the response from the job manager; and
forward the response to the kernel driver application.

21. The system of claim 20, wherein the bridge driver is further operable to queue the request and the response at the kernel layer.

22. The system of claim 21, wherein the job manger is operable to queue the response and the request in the user space.

23. The system of claim 19, wherein the job manger is operable to translate the request into a format usable by the support library and the response into a format understandable to the bridge driver.

24. The system of claim 19, wherein the kernel driver application and the bridge driver are portions of the same kernel.

* * * * *